(12) United States Patent
McPherson

(10) Patent No.: US 7,788,839 B2
(45) Date of Patent: Sep. 7, 2010

(54) COMPRESSIBLE DECOY

(76) Inventor: Jerry McPherson, 2690 Wagoneer Dr., Colstrip, MT (US) 59323

( * ) Notice: Subject to any disclaimer, the term of this patent is extended or adjusted under 35 U.S.C. 154(b) by 138 days.

(21) Appl. No.: 12/136,907

(22) Filed: Jun. 11, 2008

(65) Prior Publication Data
US 2009/0307958 A1 Dec. 17, 2009

(51) Int. Cl.
*A01M 31/06* (2006.01)
(52) U.S. Cl. .................................. 43/3; 43/2
(58) Field of Classification Search .......... 43/3, 43/2
See application file for complete search history.

(56) References Cited

U.S. PATENT DOCUMENTS

| | | | | |
|---|---|---|---|---|
| 93,293 | A * | 8/1869 | Foster | 43/3 |
| 156,239 | A * | 10/1874 | Strater, Jr. | 43/3 |
| 244,038 | A * | 7/1881 | Danz, Jr. | 43/3 |
| 395,612 | A * | 1/1889 | Curlin | 43/3 |
| 403,595 | A * | 5/1889 | Jencks | 43/3 |
| 430,565 | A * | 6/1890 | Curlin | 43/3 |
| 512,810 | A * | 1/1894 | Curlin | 43/3 |
| 529,463 | A * | 11/1894 | Roberts | 43/3 |
| 547,032 | A * | 10/1895 | Ross | 43/3 |
| 639,261 | A * | 12/1899 | Merrill | 43/3 |
| 694,732 | A * | 3/1902 | Coudon | 43/3 |
| 710,433 | A * | 10/1902 | Coudon | 43/3 |
| 812,499 | A * | 2/1906 | Johnston | 43/3 |
| 955,203 | A * | 4/1910 | Reynolds | 43/3 |
| 1,120,331 | A * | 12/1914 | Parsons | 43/3 |
| 1,409,285 | A * | 3/1922 | Dennett | 43/3 |
| 1,429,558 | A * | 9/1922 | Bauer | 43/3 |
| 1,527,711 | A * | 2/1925 | Stallman | 43/3 |
| 1,598,619 | A * | 9/1926 | Reynolds | 43/3 |
| 1,718,384 | A * | 6/1929 | Sherman | 43/3 |
| 1,789,649 | A * | 1/1931 | Gazecki et al. | 43/3 |
| 1,822,763 | A * | 9/1931 | Cook | 43/3 |
| 1,933,844 | A * | 11/1933 | Davis | 43/3 |
| 1,967,902 | A * | 7/1934 | Reichel | 43/3 |
| 2,196,078 | A * | 4/1940 | Pearce | 43/3 |
| 2,339,983 | A * | 1/1944 | Day | 43/3 |
| 2,536,736 | A * | 1/1951 | Gazalski | 43/3 |
| 2,545,800 | A * | 3/1951 | Viken | 43/3 |
| 2,564,890 | A * | 8/1951 | Fox | 43/3 |
| 2,575,893 | A * | 11/1951 | Seaman | 43/55 |
| 2,590,842 | A * | 4/1952 | Colgan | 43/3 |
| 2,651,873 | A * | 9/1953 | Risch et al. | 43/3 |
| 2,706,357 | A * | 4/1955 | Nigh et al. | 43/3 |
| 2,763,952 | A * | 9/1956 | Bruce | 43/3 |
| 2,771,700 | A * | 11/1956 | Renwick, Jr. | 43/3 |
| 2,799,961 | A * | 7/1957 | Jaumotte | 43/3 |
| 2,812,608 | A * | 11/1957 | Jones | 43/3 |
| 2,903,812 | A * | 9/1959 | Lewis | 43/3 |
| 2,914,926 | A * | 12/1959 | Meagher | 43/4 |
| 2,935,811 | A * | 5/1960 | Hurtig | 43/105 |
| 2,942,370 | A * | 6/1960 | Zaruba | 43/3 |

(Continued)

*Primary Examiner*—Darren W Ark
(74) *Attorney, Agent, or Firm*—Robert L. Shaver; Dykas, Shaver & Nipper, LLP

(57) ABSTRACT

The bird decoy, which expands into a fully three dimensional figure of a bird and may be compressed into a flat or nearly flat package. The decoy body is hollow and covers a coiled spring which may expand to display the three dimensional body of the bird and which can be compressed into a flat storage configuration. The coiled spring is covered by a fabric bird body, which has a head, tail, coloration and features all resembling a bird.

8 Claims, 2 Drawing Sheets

U.S. PATENT DOCUMENTS

| | | | |
|---|---|---|---|
| 2,952,090 A * | 9/1960 | Pittenger | 43/3 |
| 3,245,168 A * | 4/1966 | Pool | 43/3 |
| 3,930,328 A * | 1/1976 | Knuth | 43/3 |
| 4,120,110 A * | 10/1978 | Aeschliman | 43/3 |
| 4,251,937 A * | 2/1981 | Curley | 43/3 |
| 4,590,699 A * | 5/1986 | Nicks | 43/2 |
| 4,637,155 A * | 1/1987 | Johnson | 43/55 |
| 4,689,913 A * | 9/1987 | Brice | 43/3 |
| 4,821,444 A | 4/1989 | Remus | |
| 4,826,099 A * | 5/1989 | Johnson | 43/3 |
| 4,845,875 A * | 7/1989 | Norwick | 43/4 |
| 5,048,220 A * | 9/1991 | Harris | 43/55 |
| 5,561,939 A * | 10/1996 | Wik | 43/100 |
| 5,595,012 A * | 1/1997 | Coleman | 43/3 |
| 5,943,807 A * | 8/1999 | McPherson | 43/2 |
| 6,339,895 B1 * | 1/2002 | Lawson | 43/3 |
| 6,374,530 B1 * | 4/2002 | Mierau | 43/3 |
| 6,385,895 B1 * | 5/2002 | Scaries | 43/2 |
| 6,519,891 B2 * | 2/2003 | Fulcher | 43/2 |
| 6,543,176 B1 * | 4/2003 | McGhghy | 43/3 |
| 6,658,782 B2 | 12/2003 | Brint | |
| 6,662,488 B1 * | 12/2003 | Heimbrock et al. | 43/55 |
| 6,698,132 B1 | 3/2004 | Brint | |
| 6,843,702 B2 * | 1/2005 | Weiser | 43/3 |
| 6,877,267 B2 * | 4/2005 | Burton | 43/2 |
| 7,033,240 B2 * | 4/2006 | Weiser | 43/3 |
| 7,337,575 B2 * | 3/2008 | Hulley et al. | 43/3 |
| 2002/0017047 A1 * | 2/2002 | Mierau | 43/3 |
| 2003/0029074 A1 * | 2/2003 | Volz | 43/2 |
| 2007/0251135 A1 * | 11/2007 | Watlov et al. | 43/3 |
| 2009/0249678 A1 * | 10/2009 | Arnold | 43/2 |

* cited by examiner

COMPRESSIBLE DECOY

FIELD OF THE INVENTION

The invention is a bird decoy and more particularly is a bird decoy designed to expand from a flat configuration into a three dimensional configuration, and to be compressible into a flat configuration again for storage and transport.

BACKGROUND OF THE INVENTION

Hunting game birds is one of the more popular hunting sports. When hunting many kinds of birds of decoys are used. For instance, when hunting ducks and geese, decoys which resemble the three-dimensional shape and coloration of ducks and geese are utilized. To achieve a decoy with a generally three-dimensional shape, solid decoys are usually used. Solid decoys have many disadvantages. They are large and bulky, and can require a lot of work to transport them, set them up, and pick them up when the hunting is done. They also are so bulky that they may require the use of a pickup in order to haul a significant number of decoys.

It would be desirable to have a decoy which has a three-dimensional body but could be compressed into a flat configuration for storage and transport. The body must have natural and realistic coloring and shape in order to be effective as a decoy. Such a decoy could be used for geese, turkeys, ducks and other birds.

SUMMARY OF THE INVENTION

These and other objects are accomplished by the bird decoy of the present invention. The bird decoy includes a bird body made of flexible material such as cloth or plastic, with the bird body being formed to represent the three dimensional figure of a bird. Inside the bird body is a compressible spring, with the spring configured to expand when it is released, and to be compressed to a generally flat position when the decoy is to be stored. The spring is configured to form a cylinder with tapering ends which represent the neck and tail of the bird when the decoy is fully extended. The coil can be cylindrical when expanded, with the bird body including a head region and neck region which takes three-dimensional shape without the use of the coil spring. For instance, the head and neck region can be stuffed with a material which expands and causes the material of the bird body to take the shape of a bird head or a bird tail. This could be an expandable and compressible material such as foam, or other synthetic fill material.

A compressible spring of the bird decoy may also be configured to have a generally cylindrical middle part with generally conical end pieces which extend into the neck and tail region of the bird decoy. The conical sections would have a fabric covering with colorations and markings to make the conical sections appear similar to a bird head and neck, and a bird tail.

The bird decoy may include a bracket on the underside which is configured to interfit with a mounting post. The mounting post would typically be a stake, and could include a side piece to the stake which would be available for the hunter to press with his foot in order to push the mounting stick into the ground. Once the mounting stick is secured into the ground, the bird body with the mounting bracket would be connected to the mounting post.

The bird decoy can include an elastic loop attached to the body. The loop would be available for use to hold the bird decoy in a compressed shape for storage and transport.

When compressed, the bird decoy of the invention thus forms a shape in which at least part of the bird body is compressed to a nearly flat configuration. The head and tail region can also be configured for compressibility to further fit into the nearly flat configuration. The head and neck region can also have a three-dimensional shape which is only partly compressible and could be pressed into a partially flattened shape for storage and transport of the bird decoy. For instance, the head and neck can be stuffed with compressible filling, or made of compressible foam.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
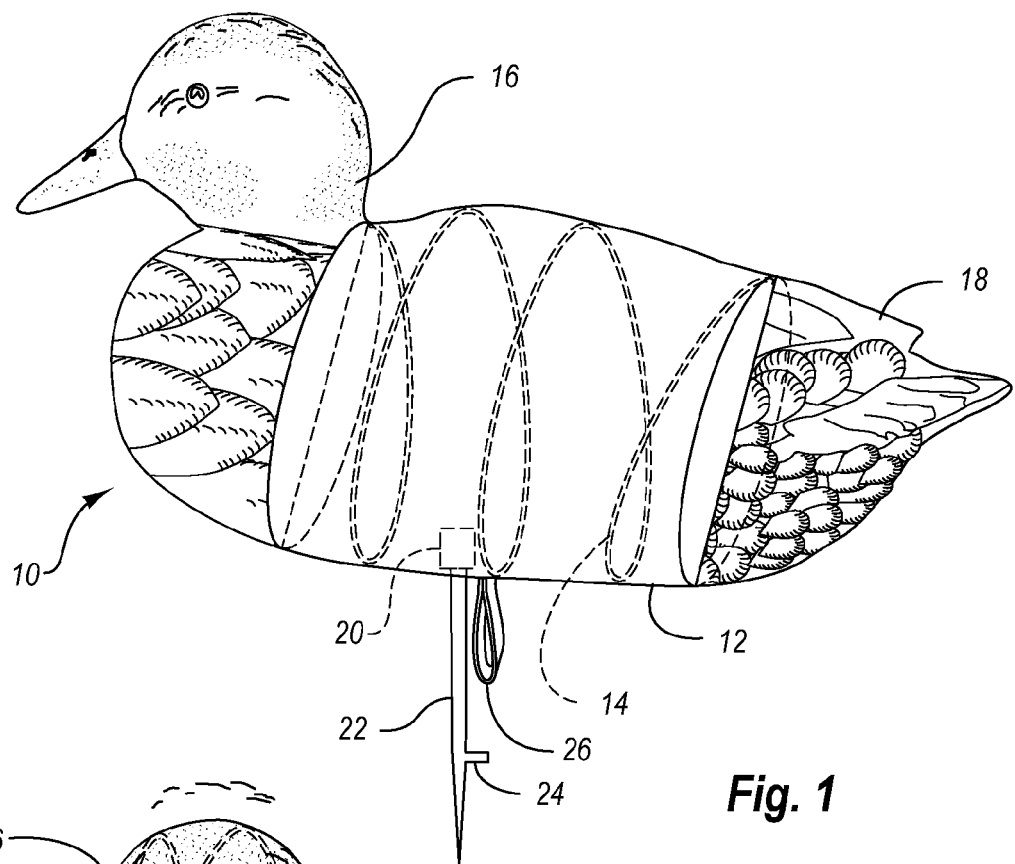
FIG. 1 is a perspective view of the compressible decoy of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 2:
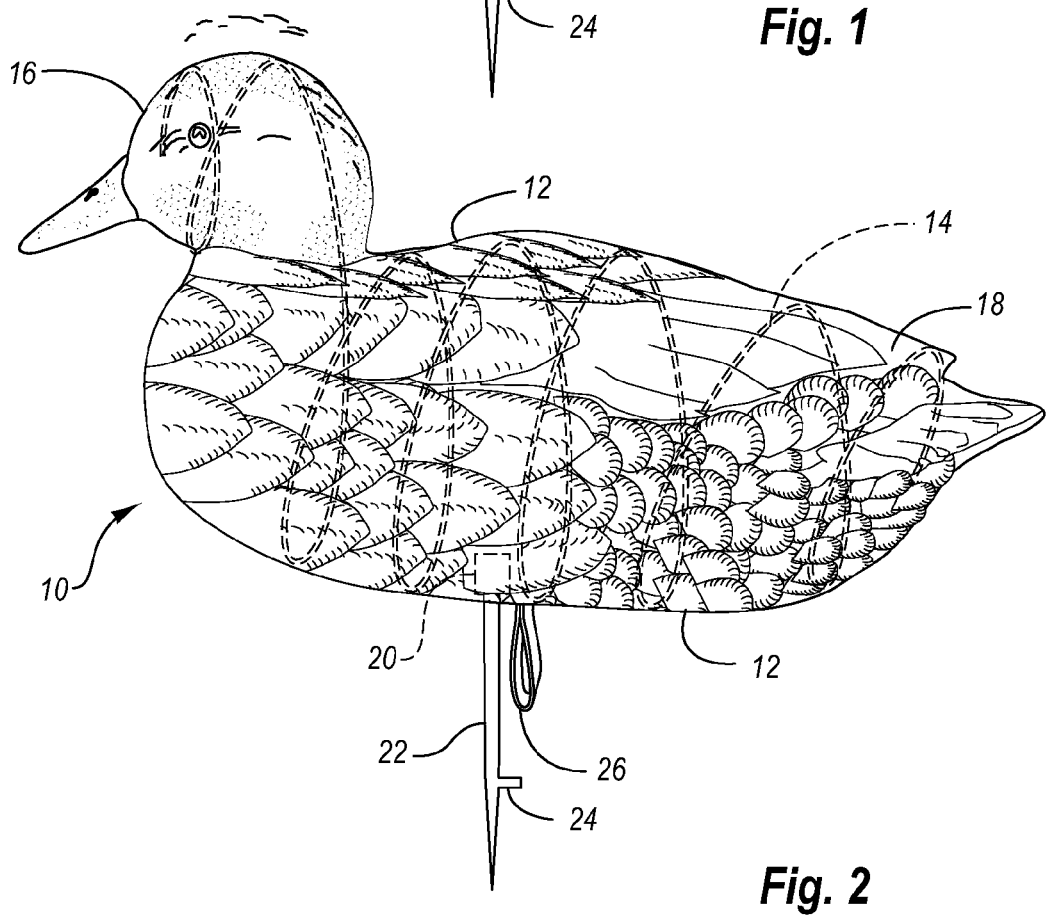
FIG. 2 is a perspective view of another version of the compressible decoy of the invention.
Figure 3:
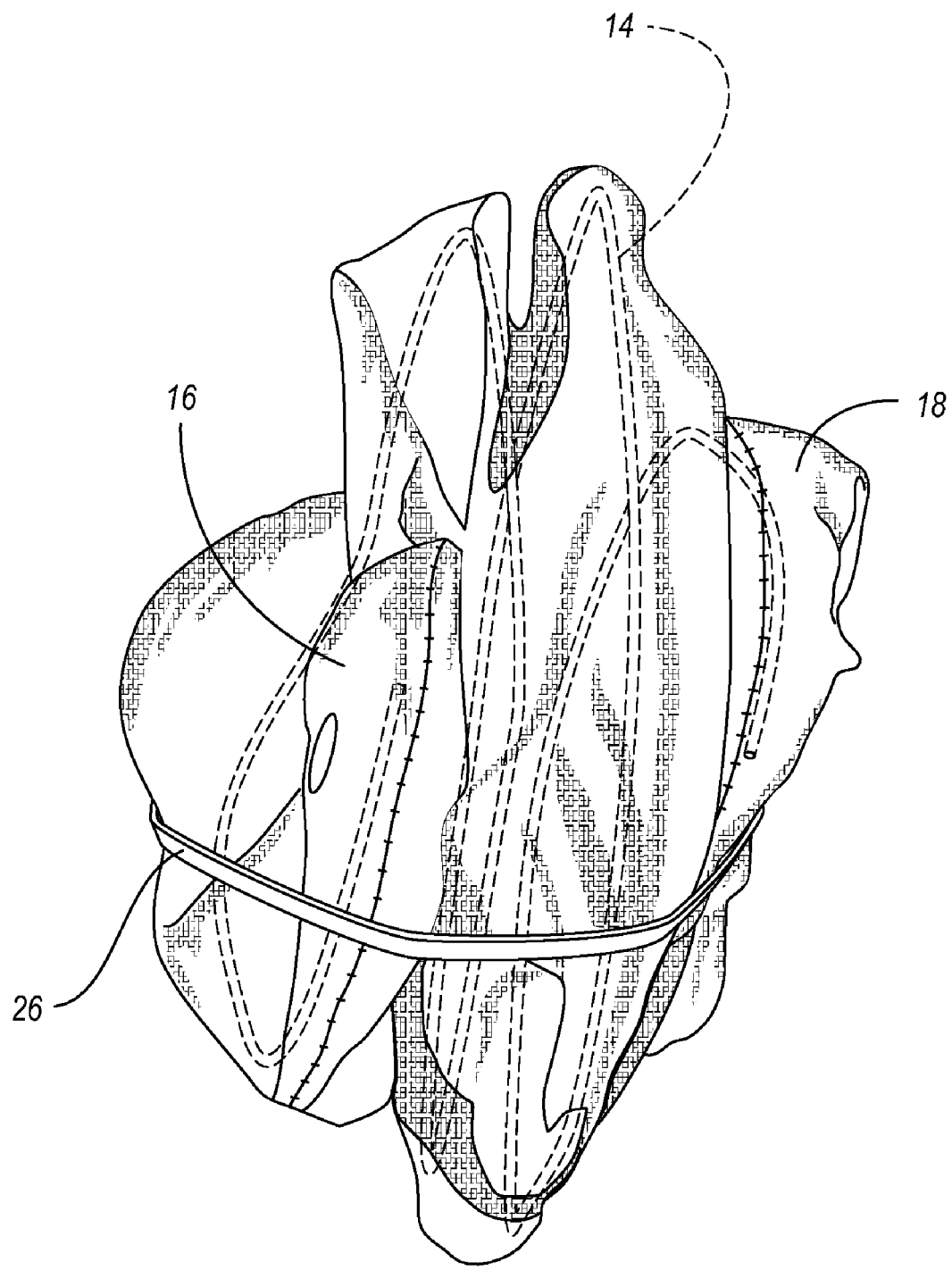
FIG. 3 is a perspective view of the compressible decoy of the invention in a compressed form.

FIGS. 1-3 show several of the preferred embodiments of the invention. FIG. 1 identifies the invention as a bird decoy 10. The bird decoy 10 includes a bird body 12, which is a two dimensional fabric material that covers a coil spring 14. The two dimensional material that makes up the bird body 12 can be a fabric such as polyester, cotton, nylon, or any number of woven fabrics. The fabric is made as a hollow piece which can be folded flat unless it is pressed into a three-dimensional form by the expansion of the coil spring 14. The bird body 12 is configured to be the general shape of the bird which it is intended to imitate. This could be a turkey, a duck, a goose, or any other bird or animal. Parts of the bird body may be pressed into a two dimensional by being stuffed with a material which intends to expand, yet it is still compressible. For instance, in FIG. 1, the head region 16 and the tail region 18 can be filled with polyester batting, foam, down, or other materials which would tend to inflate the head regions 16 and the tail region 18 to its full three-dimensional shape. In the bird decoy of FIG. 1, the coil spring 14 is generally cylindrical in shape and does not extend all of the way to the tip of the tail and the tip of the head. The colors on the bird body can be formed by printing on a fabric, by a photographic process, or any other way of transferring an image. Although woven fabrics may be utilized for the bird body, it could also be made out of non woven two dimensional materials such as nylon, polypropylenes, or other forms of plastic or other suitable materials. The bird decoy 10 includes a mounting bracket 20 which is part of the bird body. The mounting bracket 20 fits onto a mounting post 22 which is preferably a separate piece. The mounting bracket 20 can include a foot post 25, which can be used to drive the mounting post 22 into the ground. Once the mounting post 22 is driven into the ground it can be connected with the mounting bracket on the bird body.

Preferably, the coil spring is a steel spring, which extends depending upon the size of the bird decoy being depicted. Likewise, the diameter of the steel spring can be modified depending on the type of bird being imitated. As an example, a bird decoy 10, which is intended to be used in duck hunting, might have a coil spring in which the diameter of the coil is itself is 16 inches, with the coil spring extending to approximately 6 feet or more when it is fully extended. The mounting bracket and the mounting post can be formed of a number of materials, but a sturdy metal or plastic would be suitable, with either metal or plastic being equally preferred. The device also includes a storage strap 26, which can be a loop of elastic material. Once the bird decoy is compressed so that the nose and the tail are pushed towards each other and the bird decoy is compressed so that the nose and the tail are pushed towards each other and the bird decoy is basically flat, the mounting post can be slipped over the flattened form and the bird decoy can basically be stored as a dish. In the compressed form, the decoys can also be stacked together and bundled for minimum storage space and ease in transport.

FIG. 2 shows another version of the decoy of the invention which is similar to the first decoy shown in FIG. 1. It also has a bird body 12 which covers a coil spring 14, a head region 16 and a tail region 18. In the bird decoy if FIG. 2 the coil spring 14 includes portions of the spring which extends into the head region 16 and the tail region 18. In this version of the bird decoy, the bird body is supported from head to tail by the coil spring without the need for a head region 16 and a tail region 18, which are stuffed with other material such as polyester or foam. The bird decoy 10 of FIG. 2 is thus more compressible and less bulky when flattened.

FIG. 3 shows a view of either of the decoys of FIG. 1 or FIG. 2 in the flattened position, ready for transport or storage.

What is claimed is:

1. A bird decoy for use by hunters comprising:
    a bird body made of a material and generally configured to resemble a three dimensional bird figure;
    a compressible coil spring inside said bird decoy, with said spring configured to expand to press said material into a shape of said bird figure when released and which may be compressed to a generally flat position, with said coil spring extending from a tail region of said bird body, to a neck region of said bird body, with said coil spring forming a body forming spiral extending from said tail region of said bird body to said neck region of said bird body;
    a mounting post which is configured to be inserted into the ground, for support of said bird body;
    a mounting bracket attached to said bird body for interfitting engagement with said mounting post, to support said bird body, and to anchor said bird body to the ground;
    a closure means comprising a loop attached to and extending from said bird decoy for holding said bird decoy compressed in the generally flat position; and
    wherein said bird body with said spring may be compressed for storage, and when released will expand to a three dimensional shape similar in shape and coloring to a selected bird.

2. The bird decoy of claim 1 in which said bird body further includes a head region adjacent to said neck region, formed by said material into a bird like head and neck, with said head region compressible for storage and transport.

3. The bird decoy of claim 1 in which said tail region formed by said material, with said tail region compressible for storage and transport.

4. The bird decoy of claim 1 in which said closure means is an elastic loop.

5. A bird decoy for use by hunters comprising:
    a bird body made of a material and generally configured to resemble a three dimensional bird figure, with said bird body comprising a head region formed by said material into a bird like head and neck, with said head region compressible for storage and transport, and a tail region formed by said material into a bird like tail, with said tail region compressible for storage and transport;
    a compressible coil spring inside said bird body, with said spring configured to expand to press said material into a size and shape of said bird figure when released and which may be compressed to a generally flat position, with said coil extending from a tail region of said bird body, to a neck region of said bird body, with said coil spring forming a body forming spiral extending from said tail region of said bird body to said neck region of said bird body;
    a mounting post removably attachable to said bird body which is configured to be inserted into the ground, for support of said bird body;
    a mounting bracket attached to said bird body for interfitting engagement with said mounting post, to support said bird body, and to anchor said bird body to the ground;
    a closure means comprising a loop attached to and extending from said bird decoy for holding said bird decoy compressed in the generally flat position; and
    wherein said bird body with said spring may be compressed for storage, and when released will expand to a three dimensional shape similar to a bird.

6. The bird decoy of claim 5 in which said compressible spring is formed into a generally cylindrical shaped mid section configured to expand to a size and the shape allowed by said material, to the size and shape of said three dimensional bird figure when released, and includes at least one end section of said spring formed into a generally conically shaped end section when released, with said end section forming a head or tail region of said bird when covered by said bird body.

7. The bird decoy of claim 6 in which said compressible spring is formed into a generally cylindrical shaped mid section when released, and said at least one end section of said spring includes a front and a rear end section of formed into the generally conically shaped end sections when released, with said end sections forming the head and tail regions of said bird body when covered by said bird body.

8. The bird decoy of claim 5 in which said closure means is an elastic loop.

* * * * *